Patented Nov. 4, 1941

2,261,156

UNITED STATES PATENT OFFICE

2,261,156

PROCESS FOR PRODUCING CARBAMYL CHLORIDES OR ISOCYANIC ACID ESTERS

Winfrid Hentrich, Rodleben, near Dessau-Rosslau, Anhalt, and Heinz-Joachim Engelbrecht, Dessau, Anhalt, Germany, assignors, by mesne assignments, to Heberlein Patent Corporation, New York, N. Y., a corporation of New York No Drawing. Application July 13, 1939, Serial No. 284,214. In Germany July 27, 1938

16 Claims. (Cl. 260—453)

This invention relates to the process of producing carbamyl chlorides or isocyanic acid esters by reacting primary or secondary amines or their salts with compounds which liberate phosgene.

In the past, carbamyl chlorides or isocyanic acid esters have been produced by reacting the salts of primary or secondary amines with phosgene as such, but not in the nascent state. This reaction did not take place readily, and required the use of a large excess of phosgene in the gaseous phase, making the practice of the process very hazardous. Furthermore, it was necessary in successful operations of the process to carry on the reaction in autoclaves or other pressure vessels thereby making the introduction of the reagents into the reaction chamber quite difficult and at the same time tending to prevent continuous operation of the process.

It is an object of this invention to provide a process for producing carbamyl chlorides or isocyanic acid esters which eliminates these disadvantages of the prior known process. The instant process is simple and takes place under easily obtainable, commercially feasible reactive conditions. It is also an object of the instant invention to produce carbamyl chlorides or isocyanic acid esters from primary and secondary amines as well as from their salts.

Yet another object of the invention is to produce a group of compounds which find wide utility in the production of a multiplicity of synthetic products. Still another object is to produce compounds which find utility for treatment in a wide variety of commercial processes.

According to a preferred embodiment of the invention, hydrohalides of primary and secondary amines are caused to react with a group of organic compounds which liberate phosgene under the reactive conditions of the process and produce isocyanic acid esters or carbamyl chlorides. These phosgene liberating compounds can be readily procured in the solid or liquid state, thereby obviating the necessity for working with gaseous phosgene. This new reaction takes place under mild heat treatment without the necessity for using super atmospheric pressure. The reaction even begins at normal temperatures or below those at which phosgene is liberated in appreciable quantities and proceeds smoothly as the temperature rises taking up all of the phosgene as it is freed. Apart from the greater safety and simplicity of this process, great savings in the cost of raw materials result from this quantitative reaction with the nascent phosgene.

In accordance with another embodiment of the invention, the phosgene given off by these phosgene-producing organic compounds is caused to react with the primary or secondary amines as such, the reaction taking place, surprisingly, in quantitative yields. This reaction also proceeds smoothly under the same reactive conditions, producing carbamyl chlorides or isocyanic acid esters. On the other hand, prior attempts to produce such compounds from primary or secondary amines, as free bases, by reacting them with phosgene has resulted in the production of dialkyl carbamides as well as the products of the instant invention.

Among the large variety of organic compounds delivering phosgene under reactive conditions, and suitable for the practice of the instant invention, are such compounds as: chloro-formic acid trichlor methyl ester $Cl.CO.O.C.Cl_3$; hexachloro-dimethyl carbonate $(Cl_3.C)_2.CO_3$; carbonic acid methyl-tri-chloro methyl ester $H.CO.O.C.Cl_3$; perchloro-oxalic acid dimethyl ester $Cl_3.CO.OC.CO.O.C.Cl_3$; perchloro-carbonic acid dimethyl ester $Cl_3.C.CO.O.C.Cl_3$, oxalyl chloride $Cl.OC.CO.Cl$, and the like. Other compounds may be used which produce reagents which are like phosgene except that the chlorine is replaced by other halogen atoms such as bromine. For instance, such compounds containing bromine are oxalyl bromide $Br.OC.CO.Br$, the bromo-formic acid tribromethyl ester $Br.CO.O.C.Br_3$, and the like.

The liberation of phosgene and similar reagents from the aforesaid raw material for use in the processes of the present invention can be facilitated by the use of conventional catalysts. Among the catalysts found useful are such surface catalysts as powdered pumice stone, kaolin fragments, and other argillaceous materials, wood charcoal, ferric oxide, and the like.

The amines and their hydrohalic salts suitable for use as raw materials in the practice of the present invention include a wide variety of primary and secondary amines, having either cyclic or acyclic structure. These amines and their hydrohalic acid salts may be aliphatic, cycloaliphatic, aromatic or heterocyclic, or may contain mixed radicals of the foregoing types. The substituent groups on the amines may also be interrupted by known hetero atoms, or groups containing hetero atoms.

Amines containing higher molecular hydrocarbon groups, especially those of an aliphatic nature, are readily converted into compounds which have high commercial utility as such, or, the compounds first produced can be readily converted into synthetic products of wide utility. The use of aliphatic amines in the process of the invention is of particular value for the reason that prior reactions took place only in the presence of a large excess of phosgene gas and even then at a very slow rate.

The carbamyl chlorides and the isocyanic acid esters of the instant invention form especially valuable intermediate products for the synthesis of such compounds as substituted carbamides, guanidine, urethanes and similar compounds. They may be used as such in commercial processes such as impregnating and finishing textiles, foils, films, leathers. They may be also used for producing water-repellent effects in such materials and for other purposes.

The following example, in which the parts are expressed in parts by weight, will serve to illustrate the process of the instant invention.

Example 1

A solution of 56 grams chloro-formic acid trichloro methyl ester is formed in 500 ccm. of toluol and 135 grams octadecylamine are added while cooling. The solution is then heated to about 60° to 70° C., at which temperature hydrogen chloride begins to form, indicating the liberation of phosgene. The temperature is now gradually increased, the desirable temperature being indicated by the rate of evolution of hydrogen chloride. Finally the solution is heated to boiling in order to assure complete utilization of all the phosgene which the raw materials are capable of producing. After a preliminary stream of nitrogen has been passed through under a vacuum, the toluol is removed by distillation. Octadecylisocyanate amounting to about 95% of the theoretical yield is left as a colorless oil upon completion of the distillation in a nitrogen stream (boiling point of 165° to 166° C. at 1.5 mm. pressure).

The process proceeds in like manner when octadecylamine-hydrochloride is used as the raw material. The reaction is improved by adding 5 grams of activated carbon as a catalyst.

Example 2

To 129 grams dibutylamine dissolved in toluene 108 grams chloroformic acid trichlormethyl ester are slowly added. The reaction temperature is kept low at a temperature below 10° C. taking care that only hydrochloric gas and no phosgene escapes. Thereupon the reaction mixture is freed from the hydrochloric gas by passing through a stream of nitrogen and the toluene is distilled off. One obtains the N-dibutyl-carbamyl-chloride of the formula

$(C_4H_9)_2.N.CO.Cl$ in a nearly quantitative yield, which may be distilled in vaccuo for further purification.

Amines which may be used in the prescribed process as raw material are for example propylamine, octylamine, dodecylamine, montanylamine, 18-amino-pentatriacontane, cyclohexylamine, aniline, naphthylamine, benzylamine, amino hexadecyl phenol ether, 4-dodecylaniline, methylene diamine, ethylene diamine, phenylenediamine, dibutylamine, dihexylamine, dioleyl amine, dicyclohexylamine, N-octadecyl aniline, piperidine and the like. The salts of these amines may be used in the process in the same manner.

We claim:

1. The process which comprises mixing an amine compound selected from the group consisting of primary and secondary amines and their salts with a phosgene-liberating compound and reacting the amine compound with phosgene as the same is liberated in the reaction mass.

2. The process which comprises mixing an amine compound selected from the group consisting of primary and secondary amines and their salts with the chloride of formic acid trichloro methyl ester and reacting the amine compound with phosgene as the same is liberated in the reaction mass.

3. The process which comprises mixing an amine compound selected from the group consisting of primary and secondary amines and their halogen acid salts with an organic compound liberating phosgene and reacting the amine compound with phosgene as the same is liberated in the reaction mass.

4. The process which comprises mixing a compound selected from the group consisting of primary and secondary amines and their salts, said amines containing a higher molecular hydrocarbon group, with a phosgene-liberating compound which liberates phosgene upon heating and heating to produce a reaction between said phosgene and amine compound.

5. The process of producing isocyanic esters approximating the theoretical which comprises mixing a compound selected from the group consisting of primary amines and their salts, said amines containing a higher molecular hydrocarbon group, with a phosgene-liberating compound which liberates phosgene under heating and heating to produce reaction between said phosgene and compound.

6. The process of producing isocyanic acid esters which comprises reacting a compound from the group of primary amines and their salts with chloroformic acid trichlormethyl ester and heating the reaction mixture until the evolution of hydrochloric gas has ceased.

7. The process which comprises reacting a compound from the group of primary and secondary amines and their salts with chloroformic acid trichlormethyl ester.

8. The process which comprises mixing a primary amine containing an aliphatic radical of at least ten carbon atoms with a phosgene liberating compound, and heating the mixture to liberate phosgene in the nascent state to react with said amine to produce an isocyanate containing at least ten carbon atoms.

9. The process which comprises mixing a primary amine containing an aliphatic radical of at least ten carbon atoms with chloro-formic acid trichloro methyl ester, and heating the mixture to liberate phosgene in the nascent state to react with said amine to produce an isocyanate containing at least ten carbon atoms.

10. The process which comprises mixing chloro-formic acid trichloro methyl ester in an inert solvent with a primary amine containing an aliphatic radical of at least ten carbon atoms, heating the solution to produce hydrogen chloride and gradually increasing the temperature to the boiling point, and separating an isocyanate containing an aliphatic radical of at least ten carbon atoms.

11. The process which comprises mixing a primary amine containing an aliphatic radical of at least ten carbon atoms with a phosgene liberating compound and an inert solvent, and heating the mixture to liberate phosgene in the nascent state to react with said amine to produce an isocyanate containing at least ten carbon atoms.

12. The process which comprises reacting chloroformic acid trichloro methyl ester in an inert aromatic solvent with a primary amine containing an aliphatic radical of at least ten carbon atoms to produce an isocyanate, removing the solvent and recovering the corresponding isocyanate.

13. A process for producing an isocyanic acid ester, which comprises reacting chloroformic acid trichloro methyl ester under heating with an amine containing an aliphatic radical of at least ten carbon atoms in the presence of toluol, removing the solvent, and recovering the corresponding isocyanate.

14. A process in accordance with claim 11 in which the amine is used in the form of its hydro halide.

15. A process in accordance with claim 13 in which the amine is used in the form of its hydro halide.

16. A process in accordance with claim 11 in which the process is carried out in the presence of a catalyst selected from the group consisting of an argillaceous material, wood charcoal and ferric oxide.

WINFRID HENTRICH.
HEINZ-JOACHIM ENGELBRECHT.